(12) United States Patent
Xue et al.

(10) Patent No.: US 9,557,196 B2
(45) Date of Patent: Jan. 31, 2017

(54) OPTICAL FIBER CABLE, MANUFACTURING METHOD FOR THE SAME AND DISTRIBUTED MEASUREMENT SYSTEM

(71) Applicants: RESEARCH INST. OF INNOVATIVE TECH. FOR THE EARTH, Kizugawa-shi, Kyoto (JP); NEUBREX CO., LTD., Kobe-shi, Hyogo (JP)

(72) Inventors: Ziqiu Xue, Kizugawa (JP); Kinzo Kishida, Kobe (JP); Yoshiaki Yamauchi, Kobe (JP); Shinzo Suzaki, Sakura (JP)

(73) Assignees: RESEARCH INSTITUTE OF INNOVATIVE TECHNOLOGY FOR THE EARTH, Kizugawa-Shi, Kyoto (JP); NEUBREX CO., LTD., Kobe-Shi (JP)

( * ) Notice: Subject to any disclaimer, the term of this patent is extended or adjusted under 35 U.S.C. 154(b) by 0 days.

(21) Appl. No.: 14/889,643

(22) PCT Filed: Apr. 3, 2014

(86) PCT No.: PCT/JP2014/059801
§ 371 (c)(1),
(2) Date: Nov. 6, 2015

(87) PCT Pub. No.: WO2014/181617
PCT Pub. Date: Nov. 13, 2014

(65) Prior Publication Data
US 2016/0116308 A1 Apr. 28, 2016

(30) Foreign Application Priority Data

May 10, 2013 (JP) ................................. 2013-099869

(51) Int. Cl.
*G02B 6/00* (2006.01)
*G01D 5/353* (2006.01)
(Continued)

(52) U.S. Cl.
CPC ...... *G01D 5/35364* (2013.01); *G01D 5/35361* (2013.01); *G01K 11/32* (2013.01);
(Continued)

(58) Field of Classification Search
CPC ............ G01D 5/35361; G01D 5/35364; G02B 6/4407; G02B 6/4432; G02B 6/4433
See application file for complete search history.

(56) References Cited

U.S. PATENT DOCUMENTS 4,770,489 A * 9/1988 Saito .................... G02B 6/4407
385/110
4,958,899 A * 9/1990 Rochester ............ G02B 6/3803
269/20

(Continued)

FOREIGN PATENT DOCUMENTS

JP 09-258076 A 10/1997
JP 2008-139238 A 6/2008

(Continued)

OTHER PUBLICATIONS

International Search Report (PCT/ISA/210) mailed on Jul. 1, 2014, by the Japanese Patent Office as the International Searching Authority for International Application No. PCT/JP2014/059801.

*Primary Examiner* — Rhonda Peace
(74) *Attorney, Agent, or Firm* — Buchanan Ingersoll & Rooney PC

(57) ABSTRACT

In an optical fiber cable that includes an optical fiber core for measuring pressure and a multilayer armor cable for measuring temperature, an annular clearance space having a desired thickness is formed between the optical fiber core and the multilayer armor cable and fixing members for (Continued)

fixing the optical fiber core and the multilayer armor cable are provided at predetermined intervals in the axial direction of the optical fiber cable.

8 Claims, 17 Drawing Sheets

(51) Int. Cl.
    *G02B 6/44*     (2006.01)
    *G01L 1/24*     (2006.01)
    *G01K 11/32*     (2006.01)

(52) U.S. Cl.
    CPC ............... *G01L 1/242* (2013.01); *G02B 6/44* (2013.01); *G01K 2011/322* (2013.01)

(56) References Cited

U.S. PATENT DOCUMENTS

| | | | | |
|---|---|---|---|---|
| 8,306,373 | B2* | 11/2012 | Xia | ................ F01D 17/085 385/113 |
| 2007/0230879 | A1* | 10/2007 | McAlpine | ............ G02B 6/4488 385/101 |
| 2010/0290733 | A1 | 11/2010 | Xia et al. | |
| 2015/0211900 | A1* | 7/2015 | Xue | ........................ G01K 11/32 356/73.1 |
| 2016/0116308 | A1* | 4/2016 | Xue | ........................ G01L 1/242 385/12 |
| 2016/0281494 | A1* | 9/2016 | Shirdel | ................... E21B 43/24 |

FOREIGN PATENT DOCUMENTS

| | | |
|---|---|---|
| JP | 2010-185729 A | 8/2010 |
| JP | 2010-216877 A | 9/2010 |
| JP | 2010-266443 A | 11/2010 |
| JP | 2011-053146 A | 3/2011 |
| WO | WO 2014/027592 A2 | 2/2014 |

* cited by examiner

OPTICAL FIBER CABLE, MANUFACTURING METHOD FOR THE SAME AND DISTRIBUTED MEASUREMENT SYSTEM

TECHNICAL FIELD

The present invention relates to an optical fiber cable that is used in a distributed optical fiber system for measuring distributions of temperature, pressure, and strain using the optical fiber cable; a manufacturing method for the optical fiber cable; and a distributed measurement system for measuring distributions of temperature, pressure, and strain all at once using the optical fiber cable.

BACKGROUND ART

Conventionally, a system has been known that is capable of measuring distributions of temperature and pressure of a measurement object with a multilayer armor cable having two kinds of optical fibers as sensors (for example, Patent Document 1). In this system, a Brillouin frequency shift $\Delta v_B$ and a Rayleigh frequency shift $\Delta v_R$ of the two kinds of optical fibers are detected for each optical fiber to determine distributions of temperature and pressure of the measurement object from the four values. Specifically, the four values are, for example, a Brillouin frequency shift and a Rayleigh frequency shift of an optical fiber core 10, which is a sensor of an optical fiber cable, and a Brillouin frequency shift and a Rayleigh frequency shift of an FIMT 4 (FIMT is abbreviation of "fiber in metal tube" meaning "metal-tube-covered optical fiber core". The abbreviation is used hereinafter) (see FIGS. 10 and 11).

Since the pressure and temperature are those of a field where the optical fiber cable exists, the two kinds of optical fibers have the same values. Here, assuming temperatures of each fibers to be $T_1$ and $T_2$, and defining $\Delta P$ and $\Delta T$ as $\Delta P = P - P_o$ and $\Delta T = T_1 - T_o = T_2 - T_o$ using a reference pressure $P_o$ (for example, atmospheric pressure) and a reference temperature $T_o$ (for example, room temperature), a relationship expressed by the following Eq. (1) holds true between the pressure change $\Delta P$, the temperature change $\Delta T$, and strain changes $\Delta\varepsilon_1$, $\Delta\varepsilon_2$, of the measurement object and the four frequency shift values:

$$\begin{pmatrix} \Delta P \\ \Delta T \\ \Delta \varepsilon^1 \\ \Delta \varepsilon^2 \end{pmatrix} = (d_{ij}) \begin{pmatrix} \Delta v_B^1 \\ \Delta v_R^1 \\ \Delta v_B^2 \\ \Delta v_R^2 \end{pmatrix} \quad (1)$$

Here, the Brillouin frequency shift $\Delta v_B$ and the Rayleigh frequency shift $\Delta v_R$ of the optical fiber core 10 and those of the FIMT 4 are distinctively expressed with the superscripts "1" and "2", respectively, and $d_{ij}$ are characteristic coefficients of each optical fiber based on the frequency shifts and are determined as an inverse matrix of sensitivity coefficients of each optical fiber to the frequency shifts.

The pressure and temperature distribution measurement technology using the optical fibers can be applied to distribution measurement of a volumetric change of an object. For example, porous sandstone, because it changes in volume before and after containing liquid, is one application target of the foregoing measurement technology. However, a conventional distributed optical fiber system using an armored cable cannot correctly measure a strain distribution in some cases because of problems in manufacturing the cable.

PRIOR ART DOCUMENT

Patent Document

Patent Document 1: JP 2010-216877 A

For example, a distributed pressure sensor utilizes a Brillouin frequency shift caused by a strain applied to an optical fiber. In order to measure a pressure applied to the optical fiber, the optical fiber sensor is necessarily fixed to a pressure deformable probe. The pressure can thereby be measured from strain of the optical fiber sensor caused by deformation of the probe subject to the pressure. Thus, a pressure distribution along the optical fiber cable can be measured by measuring a Brillouin frequency shift of the optical fiber sensor fixed to the probe.

SUMMARY OF THE INVENTION

Problem that the Invention is to Solve

However, since precise control of fixed positions of the optical fiber and a steel cable wire used in the multilayer armor cable has conventionally been in a difficult situation because of problems in manufacturing the multilayer armor cable, sufficiently accurate values have not been obtained so far in the pressure measurement. The reason for that will be explained below with reference to the drawings.

FIG. 12 is an illustration schematically showing positional relationships between the optical fiber core 10 and the steel cable wire in the innermost layer of the multilayer armor cable 50 in a conventional optical fiber cable. In the figure, the optical fiber core 10 is made up of an innermost optical fiber waveguide 11 having a sensing function, a primary coat 12 directly coating the optical fiber waveguide 11, and a secondary coat 13 further coating the primary coat. In design, the steel cable wire in the innermost layer of the multilayer armor cable 50 is positioned as indicated by 51 in the figure, i.e., the design is made so that the diameter of the optical fiber core is smaller than that of a gap formed by the steel cable wire. However, it is conceivable that the wound condition of the armor cable changes depending on the manufacturing and the wire is fixed at various positions relative to the outline $L_s$ of the optical fiber core 10 as indicated by 51, 52, 53 in the figure. Specifically, the steel cable wire is in the position indicated by 51 in the figure, i.e., is fixed spaced from the outline $L_s$, in other words, the gap is formed between the optical fiber core 10 and the multilayer armor cable 50 (case a); the steel cable wire is in the position indicated by 52 in the figure, i.e., is fixed touching the outline $L_s$ (case b); or the steel cable wire is in the position indicated by 53 in the figure, i.e., is fixed inside the outline $L_s$ of the optical fiber core 10 (case c). In the case a (referring to FIG. 11, the innermost armor cable (its circumference is indicated by the solid line) is not at a position touching the optical fiber core but at a position with some gap (the circumference is indicated by the broken line)), the fiber is subjected to a pressure the same as an outer pressure because fluid is entered into the gap. In the case b (referring to FIG. 11, the innermost armor cable (its circumference is indicated by a solid line) is positioned touching the optical fiber core) and in the case c, on the other hand, the value of pressure received by the center optical fiber waveguide 11 is different from that of the outer pressure applied to the multilayer armor cable.

The cases b and c are explained with reference to a model shown in FIG. 9. The figure shows a simple model for evaluating a pressure (a stress orthogonal to radial direction) received by a pillar body (a modelling of the optical fiber waveguide) enclosed by an outside annular body (a modelling of the multilayer armor cable) and a pressure applied to the annular body. In measurement with an ordinary optical fiber, the pillar body and the annular body are combined in a single body as shown in FIG. 9A. Thus, the pressure is measured at the pillar body, which is a sensor portion, under the condition that the annular body is subjected to an external pressure $P_o$. The pressure value at the sensor portion is evaluated under such condition.

The annular body and the pillar body are assumed here to be a circular annular body and a circular pillar body, respectively, and to be formed of homogeneous isotropic elastic materials. Letting the radii of the circular annular body and the circular pillar body be b and a and Lamé constants thereof, which are moduli of elasticity, be $\lambda_1$, $\mu_1$ and $\lambda_2$, $\mu_2$, respectively, a pressure $P_i$ applied to the circular pillar body is evaluated by splitting FIG. 9A into two: FIG. 9B and FIG. 9C. Here, the internal pressure of the circular annular body is assumed to be $P_i$. The Hooke's law in the linear elastic theory is expressed by the following Eq. (2) using Lamé parameters $\lambda$ and $\mu$:

$$\sigma_{ij} = 2\mu\epsilon_{ij} + \lambda\epsilon_{kk}\delta_{ij} \quad (2)$$

In Eq. (2), $\sigma$ and $\epsilon$ represent stress and strain, respectively, and the subscripts i, j indicate two directions among three directions orthogonal to each other (for example, assuming x-, y-, z-axes to be three axes orthogonal to each other, the x- and the y-axis directions indicate the two directions among them), and $\delta_{ij}$ is Kronecker delta. In general, $\lambda$ and $\mu$ are referred to as Lamé's first parameter and Lamé's second parameter, respectively, and have positive values. And $\mu$ is also called modulus of rigidity and is typically expressed by G.

In FIG. 9B, the displacement $u_1$ (r=a) of the circular annular body at a radial position a necessarily equals the displacement $u_2$ (r=a) of the circular pillar body at the radial position a. In this case, the pressure $P_i$ is expressed by the pressure $P_o$ as Eq. (3):

$$p_i = \frac{\frac{\lambda_1}{\mu_1} + 2}{\frac{\lambda_1}{\mu_1} + 2 - \left(1 - \frac{\lambda_1 + \mu_1}{\lambda_2 + \mu_2}\right)\left\{1 - \left(\frac{a}{b}\right)^2\right\}} \cdot P_o \quad (3)$$

Since a<b in FIG. 9A, a value of the term in the braces { } in the denominator of the equation is always positive, thus leading to the following conclusions.

Case 1: when the elastic moduli of the circular annular body and the circular pillar body are equal to each other, i.e., Eq. (4) holds true, it results in $P_i = P_o$.

$$\lambda_1 + \mu_1 = \lambda_2 + \mu_2 \quad (4)$$

Case 2: when the elastic modulus of the circular annular body is larger than that of the circular pillar body, i.e., Eq. (5) holds true, it results in $P_i < P_o$.

$$\lambda_1 + \mu_1 > \lambda_2 + \mu_2 \quad (5)$$

Case 3: when the elastic modulus of the circular annular body is smaller than that of the circular pillar body, i.e., Eq. (6) holds true, it results in $P_i > P_o$.

$$\lambda_1 + \mu_1 < \lambda_2 + \mu_2 \quad (6)$$

That is, in the case 2, the pressure (the stress orthogonal to the radial direction) received by the circular pillar body (corresponding here to the optical fiber) is smaller than that applied to the circular annular body (corresponding here to the multilayer armor cable). In other words, in the cases b and c, the value of the pressure received by the center optical fiber waveguide 11 is smaller than that of the outer pressure applied to the multilayer armor cable 50. Thus, the pressure value of a measurement field outside the armor cable cannot be correctly evaluated.

That is demonstrated below using actual experimental data. FIG. 13 shows measurement data of pressure distributions over 3 m long along the optical fiber cable for three reference pressure values of 25 MPa, 15 MPa, 5 MPa, which data is converted using the pressure and strain sensitivities based on the optical fiber element test to pressures from Brillouin and Rayleigh frequency shifts obtained by using the optical fiber cable of the multilayer armor cable form. The numerals in the figure indicate the reference pressure values. The figure shows that the measurement data has values smaller than the reference pressure values for any of the reference pressure values, although their decrements differ depending on the reference values.

Moreover, since the relative positions of the optical fiber core and the steel cable wire of the multilayer armor cable cannot be controlled in a ganged manner and the measurement is usually performed with the measurement object being fixed to the steel cable wire in the outermost armor layer, it cannot be ensured that strain of the optical fiber core 1 is coincident with that of the measurement object. Thus, the distributed pressure and temperature measurement system (DPTS) has been in a situation of not performing strain distribution measurement with high accuracy.

In spite of such a situation described above, in a technology used in, for example, carbon dioxide capture and storage (CCS), i.e., geological sequestration of $CO_2$ separated and recovered from gases exhausted such as from power plants and factories, strain produced for example by pressure increase associated with $CO_2$ injection and by $CO_2$ infiltration into rock is measurement subject and a precise strain measurement is particularly required to monitor the $CO_2$ stored underground. Furthermore, a technology is desired that is also applicable to production such as of shale gas.

The present invention is made in light of the above-described problem and aimed at making it possible to provide, in a distributed optical fiber measurement system using an armored-type optical fiber cable, an optical fiber cable that has a gap formed between the optical fiber waveguide and the armor cable and has fixing members for fixing the optical fiber waveguide and the armor cable and is capable of accurately measuring all at once distributions of pressure, temperature, and strain of a measurement object using two kinds of optical fibers in the optical fiber cable; and at making it possible to provide a method of manufacturing the optical fiber cable and the distributed measurement system.

Means for Solving the Problem

An optical fiber cable according to the present invention is installed in or along a measurement object so as to be deformed along with the measurement object, and is for measuring distributions of pressure, temperature, and strain of the measurement object by using a Brillouin frequency shift and a Rayleigh frequency shift of light entered into and scattered in the optical fiber cable. The optical fiber cable includes an optical fiber core for measuring pressure of the measurement object; and a multilayer armor cable for measuring temperature of the measurement object, wherein an annular clearance space is formed between the optical fiber core and the multilayer armor cable, and fixing members are arranged in the clearance space at intervals in the axial direction of the optical fiber cable to fix the optical fiber core and the multilayer armor cable.

A method of manufacturing the optical fiber cable according to the present invention includes the steps of: removing a water resolvable coat after an outermost layer of an optical fiber core of the optical fiber cable measuring pressure is annularly coated with the water resolvable coat having a desired thickness and the optical fiber cable is armored with an armored layer; and fixing the optical fiber core and the armor layers to each other after removal of the water resolvable coat.

A distributed measurement system according to the present invention is configured to measure all at once distributions of pressure, temperature, and strain of a measurement object, using the optical fiber cable, which is installed in or along a measurement object so as to be deformed along with the measurement object and is for measuring distributions of pressure, temperature, and strain of the measurement object by using a Brillouin frequency shift and a Rayleigh frequency shift of light entered into and scattered in the optical fiber cable and includes an optical fiber core for measuring pressure of the measurement object and a multilayer armor cable for measuring temperature of the measurement object wherein an annular clearance space is formed between the optical fiber core and the multilayer armor cable and fixing members are arranged in the clearance space at intervals in the axial direction of the of the optical fiber cable to fix the optical fiber core and the multilayer armor cable and, with a hybrid-type Brillouin and Rayleigh backscattered light measuring instrument analyzing a Brillouin frequency shift and a Rayleigh frequency shift in scattered light scattered in the optical fiber cable and determining distributions of pressure, temperature, and strain of material.

Furthermore, a distributed measurement system according to the present invention is configured to measure, using the optical fiber cable, distributions of pressure, temperature, and strain of a measurement object all at once, from a Rayleigh phase shift instead of a Rayleigh frequency shift, with a Brillouin backscattered light measuring instrument and a Rayleigh phase measuring instrument analyzing a Brillouin frequency shift and a Rayleigh phase shift, respectively, in scattered light scattered in the optical fiber cable and determining distributions of pressure, temperature, and strain of material.

Advantages of the Invention

According to the present invention, a remarkable effect can be brought about that makes it possible to provide an optical fiber cable capable of accurately measuring all at once distributions of pressure, temperature, and strain of a measurement object, and to provide a method of manufacturing the optical fiber cable and a distributed measurement system.

EMBODIMENTS FOR CARRYING OUT THE INVENTION

Embodiments of the present invention will be described below with reference to the drawings.

Embodiment 1

Figure 1:
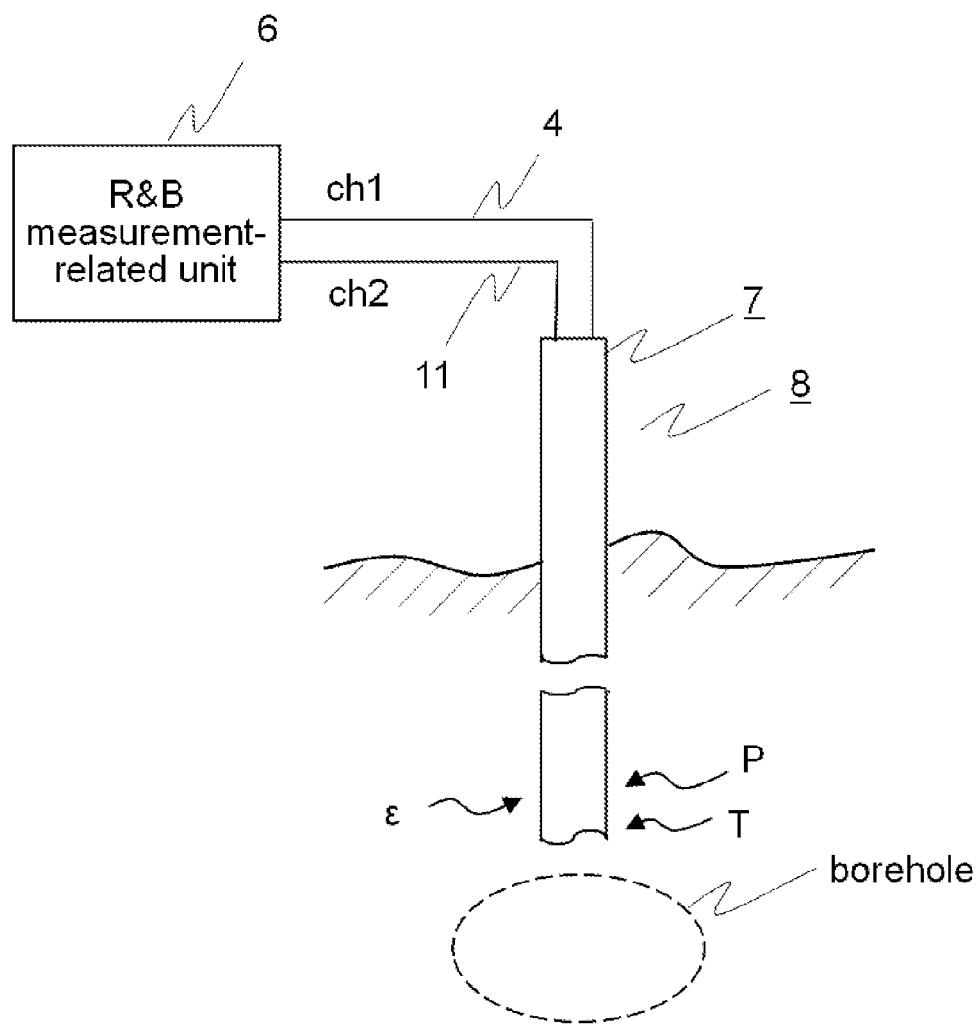
FIG. 1 is a schematic illustration showing a distributed optical fiber system according to Embodiment 1 of the present invention for measuring pressure, temperature, and strain.

FIG. 1 is a schematic illustration showing a distributed optical fiber system 8 according to Embodiment 1 of the present invention for measuring pressure, temperature, and strain all at once by using frequency information in Brillouin scattering and Rayleigh scattering of an optical fiber. Referring to the figure, an optical fiber cable 7 having an armor cable is provided with multilayer armor wires, and made up of an FIMT 4 that has an optical fiber serving a sensor function such as a temperature sensor, an optical fiber waveguide 11 that is a sensor function part of an optical fiber core, and the others. These cables are fixed to strata such as by cementing. A hybrid-type Brillouin and Rayleigh backscattered light measuring instrument 6 (expressed as "R&B measurement-related unit" in FIG. 1) enters light into these optical fibers (the light is entered into the FIMT 4 from a channel 1 and into the optical fiber waveguide 11 from a channel 2) and measures and analyzes frequencies of the light entering into the two optical fibers and frequency shifts of scattered light therefrom. The distributed optical fiber system 8 thus configured can accurately measure all at once distributions of pressure P, temperature T, and strain $\epsilon$ of a borehole, a measurement target (for example, $CO_2$ injecting well).

Next, a measurement procedure of the measurement system is described. First, the Brillouin frequency shifts $\Delta v_B$ between the entered light and the scattered light are expressed by Eqs. (7) and (8):

$$\Delta v_B^1 = C_{11}^1 \Delta \epsilon^1 + C_{12}^1 \Delta T + C_{13}^1 \Delta P \qquad (7)$$

$$\Delta v_B^2 = C_{11}^2 \Delta \epsilon^2 + C_{12}^2 \Delta T \qquad (8).$$

Here, the superscript numerals of $\Delta v_B$ denote the kinds of optical fibers: "1" refers to the optical fiber waveguide and "2" refers to the FIMT. The coefficients $C_{ij}$ are sensitivity coefficients specific to the optical fibers, and the superscript numerals refer to the respective kinds of optical fibers. The superscript numerals of $\epsilon$ also refer to the respective kinds of optical fibers as with the above. In addition, that no term relating to $\Delta P$ appears in Eq. (8) is due to the fact that the FIMT is isolated from influence of pressure.

Second, the Rayleigh frequency shifts $\Delta v_R$ are expressed by Eqs. (9) and (10):

$$\Delta v_R^1 = C_{21}^1 \Delta \epsilon^1 + C_{22}^1 \Delta T + C_{23}^1 \Delta P \qquad (9)$$

$$\Delta v_R^2 = C_{21}^2 \Delta \epsilon^2 + C_{22}^2 \Delta T \qquad (10).$$

Here, the superscript numerals of $\Delta v_R$ denote the kinds of optical fibers: "1" refers to the optical fiber waveguide and "2" refers to the FIMT. In addition, that no term relating to $\Delta P$ appears in Eq. (10) is due to the fact that the FIMT is isolated from influence of pressure. The definitions of the other symbols are the same as those with $\Delta v_B$; hence, they are omitted here.

From these Eqs. (7) to (10), using characteristic coefficients $D_{ij}$ (which are characteristic coefficients based on frequency shifts and determined as the inverse matrix of the sensitivity coefficients $C_{ij}$), a relationship expressed by Eq. (11) holds true between pressure change $\Delta P$, temperature change $\Delta T$, strain change $\Delta \epsilon$ and $\Delta v_B$, $\Delta v_R$:

$$\begin{pmatrix} \Delta P \\ \Delta T \\ \Delta \epsilon^1 \\ \Delta \epsilon^2 \end{pmatrix} = (D_{ij}) \begin{pmatrix} \Delta v_B^1 \\ \Delta v_R^1 \\ \Delta v_B^2 \\ \Delta v_R^2 \end{pmatrix}. \qquad (11)$$

Thus, pressure change $\Delta P$, temperature change $\Delta T$, and strain change $\Delta \epsilon$ of a measurement object can be calculated from frequency shift information using Eq. (11).

While the above describes the outline of procedure for calculating pressure change $\Delta P$, temperature change $\Delta T$, and strain change $\Delta \epsilon$ of the measurement object using frequency information in Brillouin and Rayleigh scattering, a method using phase information is also effective to calculate pressure change $\Delta P$, temperature change $\Delta T$, and strain change $\Delta \epsilon$ of the measurement object. The method using phase information is particularly effective when measurement time is restricted, because measuring a Rayleigh frequency shift usually takes longer time than measuring a Brillouin frequency shift. The following describes the outline of the procedure for calculating pressure change $\Delta P$, temperature change $\Delta T$, and strain change $\Delta \epsilon$ of the measurement object using the phase information.

The method uses phase information in Rayleigh scattering instead of frequency information therein. Letting $C_{3j}$ be sensitivity coefficients for Rayleigh scattering phase shifts, the Rayleigh scattering phase shifts $\Delta \phi_R$ of the optical fiber waveguide and the FIMT are respectively expressed by Eqs. (12) and (13):

$$\Delta \phi_R^1 = C_{31}^1 \Delta \epsilon^1 + C_{32}^1 \Delta T + C_{33}^1 \Delta P \qquad (12)$$

$$\Delta \phi_R^2 = C_{31}^2 \Delta \epsilon^2 + C_{32}^2 \Delta T \qquad (13).$$

Here, $\Delta \epsilon$ is an axial strain of the optical fiber cable under measurement, and $C_{31}$, $C_{32}$, $C_{33}$ are strain, temperature, pressure sensitivity coefficients for Rayleigh phase, respectively. In addition, that no term relating to $\Delta P$ appears in Eq. (13) is due to the fact that the FIMT is isolated from influence of pressure. The definitions of the other symbols are the same as those with $\Delta v_B$; hence, they are omitted here.

From Eqs. (7) and (8) and Eqs. (12) and (13), using characteristic coefficients $F_{ij}$ (which are characteristic coefficients based on frequency shifts and phase shifts, and determined as an inverse matrix of the sensitivity coefficients $C_{1j}$ and $C_{3j}$), a relationship expressed by Eq. (14) holds true between pressure change $\Delta P$, temperature change $\Delta T$, strain change $\Delta \epsilon$ and $\Delta v_B$, $\Delta v_R$:

$$\begin{pmatrix} \Delta P \\ \Delta T \\ \Delta \epsilon^1 \\ \Delta \epsilon^2 \end{pmatrix} = (F_{ij}) \begin{pmatrix} \Delta v_B^1 \\ \Delta \varphi_R^1 \\ \Delta v_B^2 \\ \Delta \varphi_R^2 \end{pmatrix}. \qquad (14)$$

Thus, pressure change $\Delta P$, temperature change $\Delta T$, strain change $\Delta \epsilon$ of the measurement object can be calculated from frequency shift information and phase shift information using Eq. (14). In this case, a Brillouin backscattered light measuring instrument and a Rayleigh phase measuring instrument are needed instead of the hybrid-type backscattered light measuring instrument. In addition, the method using only phase information is explained in the following reference literatures: (1) Shiuh-Chuan Her, Chih-Min Yang "Dynamic Strain Measured by Mach-Zehnder Interferometric Optical Fiber Sensors", Sensors Vol. 12 (ISSN 1424-8220), March 2012, pp. 3314-3326; and (2) J. H. Cole, et al., "TWENTY-FIVE YEARS OF INTERFEROMETRIC FIBER OPTIC ACOUSTIC SENSORS AT THE NAVAL RESEARCH LABORATORY", Washington Academy of Sciences, Fall, 2004, pp. 40-57. It should be noted here that $\Delta \phi_R$ in Eqs. (12) to (14) denotes a phase shift due to the interference principle and is physical quantity different from the Rayleigh scattering based entered-light frequency change $\Delta v_R$ appearing in Eq. (11) and in the equations prior thereto.

Figure 2:
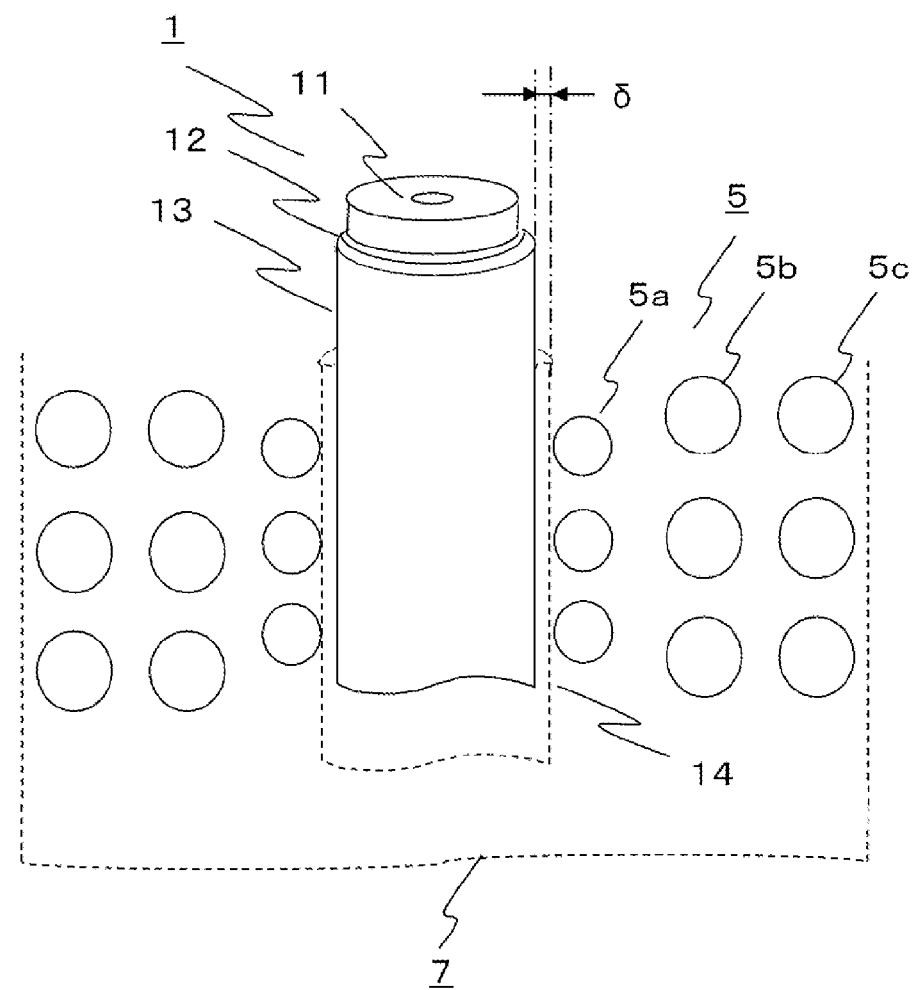
FIG. 2 is an illustration schematically showing an optical fiber cable used in the distributed optical fiber system according to Embodiment 1 of the present invention.

FIG. 2 is an illustration schematically showing the optical fiber cable 7 used in the distributed optical fiber system 8 in FIG. 1. In the figure, the optical fiber cable 7 is broadly made up of the optical fiber core 1 disposed at the center and a multilayer armor cable 5. The optical fiber core 1 is composed of the optical fiber waveguide 11 made of glass and has a sensor function, arranged in the innermost portion; a primary coat 12 having water-proof and hydrogen-proof effects, formed to directly coat the optical fiber waveguide 11; and a secondary coat 13 for protecting and reinforcing the optical fiber waveguide 11, formed to further coat the primary coat. And the multilayer armor cable 5 is arranged around the secondary coat 13 with a constant gap $\delta$.

The constant gap $\delta$ is formed through the following process: a water resolvable coat 14 or the like is formed around the outer circumference of the secondary coat 13 in an initial step of manufacturing the optical fiber cable; and then, after the armor cable is formed around the resin layer in the subsequent step, the water resolvable coat 14 is dissolved in water or hot water by immersing the optical fiber cable 7 in the water or hot water. In this way, the gap is formed as a clearance space having a desired thickness. In actual pressure measurement, a pressure and the others of the measurement object (liquid) flowing into the clearance space are measured with the optical fiber core 1.

Specifically, the water resolvable coat 14 is designed to have a desired thickness (which is the width of the constant gap $\delta$, and is usually about several tens to several hundreds μm in radial direction size), and formed to exhibit necessary mechanical performances such as of abrasion resistance, pressure resistance, and sufficient tensile strength when the optical fiber cable is armored (winding of wires around an optical fiber core is called "armoring"). Immediately after armored, the multilayer armor wires are in contact with the water resolvable coat 14. After that, the optical fiber cable is immersed in water or hot water, to remove the water resolvable coat 14. In addition, if the observation well is an oil well, the constant gap $\delta$ can be formed by an oil-soluble resin substituted for the water resolvable coat 14.

Using a low-melting resin for the water resolvable coat 14 is another method of removing the layer. Specifically, forming the water resolvable coat 14 of a material having a melting point of, for example, approximately 100° C. (polyethylene can be used, for example) and forming the primary coat 12 and the secondary coat 13 of materials having melting points of over 200° C., allow the water resolvable coat 14 to be removed by heating the whole optical fiber cable to a temperature of 150° C. after the cable is armored. In addition to the above, instead of the water resolvable coat 14, a material can also be used that has a function of overcoating the optical fiber core 1 and is removable later, specifically such as an oil-soluble material, an alcohol-soluble material, or a polymer glass that become powder when compressed. In addition, the resin layer can also be meltingly removed underground while cementing, after the optical fiber cable provided with a protective resin layer is buried underground.

Figure 3:
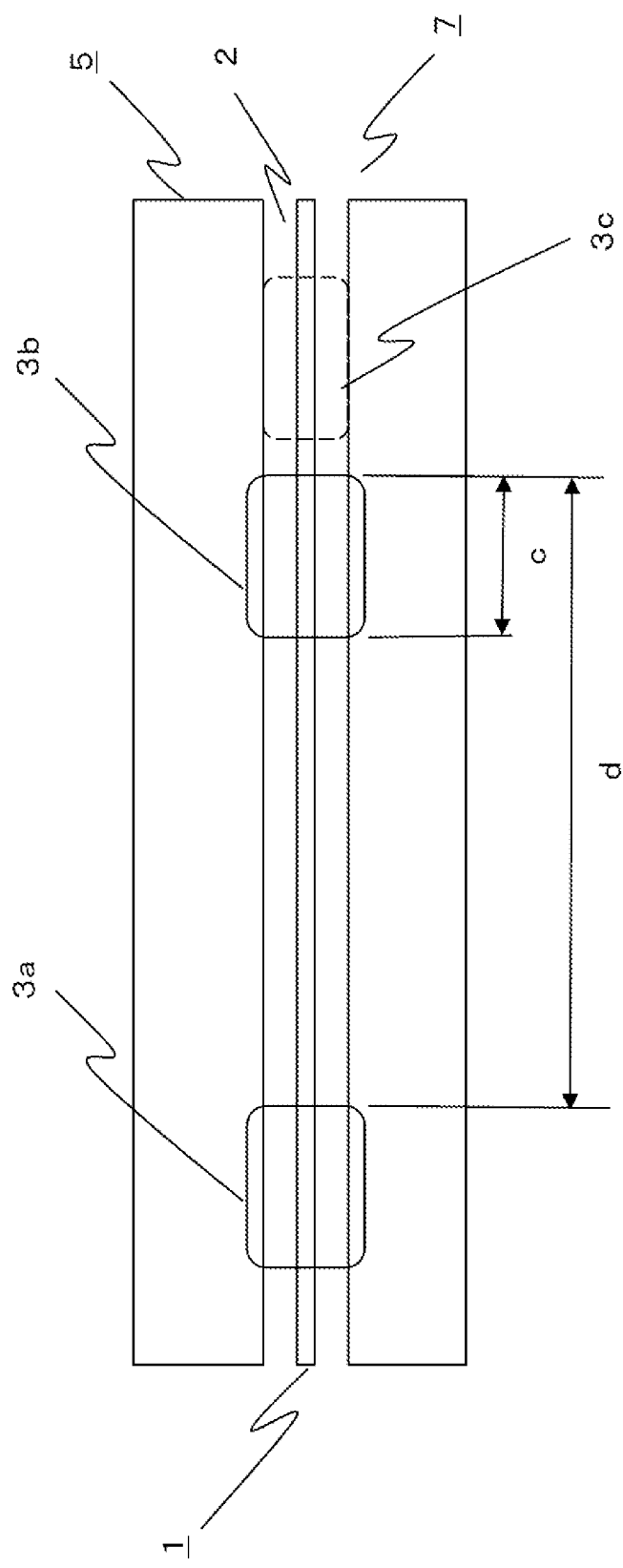
FIG. 3 is a schematic axial (longitudinal) cross section of the main portion of the optical fiber cable according to Embodiment 1 of the present invention.

FIG. 3 is a schematic axial (longitudinal) cross section of the main portion of the optical fiber cable having the constant clearance space 2 formed between the optical fiber core 1 and the multilayer armor cable 5. As shown in the figure, not only the clearance space 2 is formed as described above, but also fixing members 3a and 3b of length c are provided at intervals of a pitch d in the axial (longitudinal) direction of the optical fiber to fix the optical fiber core 1 and the multilayer armor cable 5. This is due to the fact that only forming the clearance space does not allow for accurately measuring strain produced in the optical fiber because the optical fiber core 1 does not fixed relative to the multilayer armor cable. Hence, the optical fiber core 1 and the multilayer armor cable 5 need to be fixed to each other after the clearance space 2 is formed.

In this case, since the optical fiber core 1 and the multilayer armor cable 5 may only be fixed to each other, it is sufficient that the fixing members used have a radial size (orthogonal to the axial direction) larger than the radius of the inward side of the annular multilayer armor cable. That is, the fixing members may only have a radius larger than that of a fixing member 3c shown in the figure. A fixing method is usually employed in which the fixing is performed by an adhesive such as resin to the radial position of the innermost layer (the layer indicated by 5a in FIG. 2) of the armor cable layers constituting the multilayer armor cable (see the fixing members 3a, 3b). Note that while FIG. 3 shows a case of the constant interval d (longitudinal pitch) between the fixing members 3a and 3b, the interval is not limited to this but may be an irregular pitch because the optical fiber core 1 and the multilayer armor cable 5 can only be fixed to each other.

Figure 4:
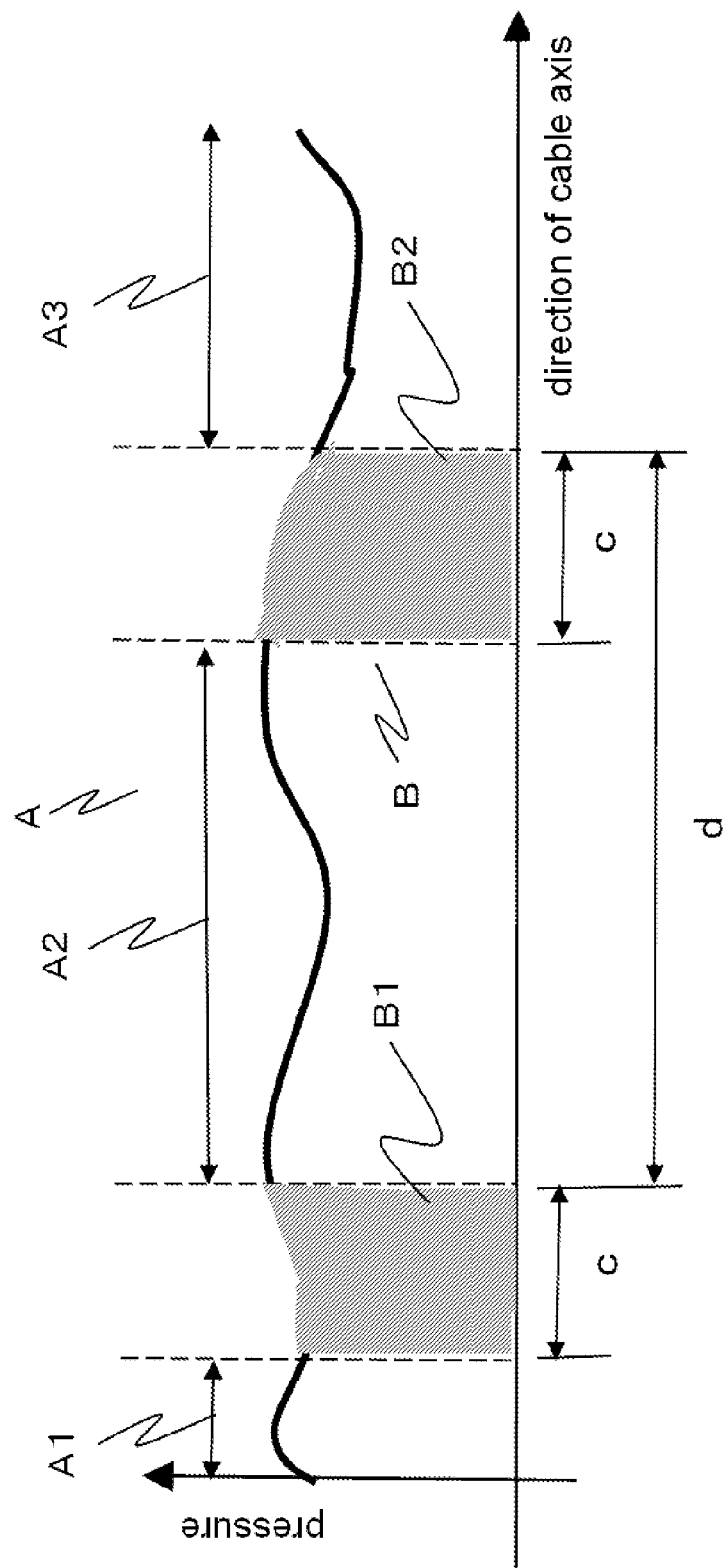
FIG. 4 is a graph showing a relation between measured pressures and axial positions along the optical fiber cable according to Embodiment 1 of the present invention.

In the optical fiber cable made up as shown in FIG. 3, the fixing member sections (indicated by B1, B2 in the figure) are insensitive to pressure as illustrated in the graph showing a relation between measured pressure values and axial positions along the cable (FIG. 4). The optical fiber core 1, although it cannot perform proper pressure measurement in the insensitive sections, exhibits an effect capable of performing pressure distribution measurement with high accuracy (accuracy of the pressure measurement is less than 5 psi) in the sections without the fixing members (indicated by A1, A2, and A3 in the figure).

Figure 5:
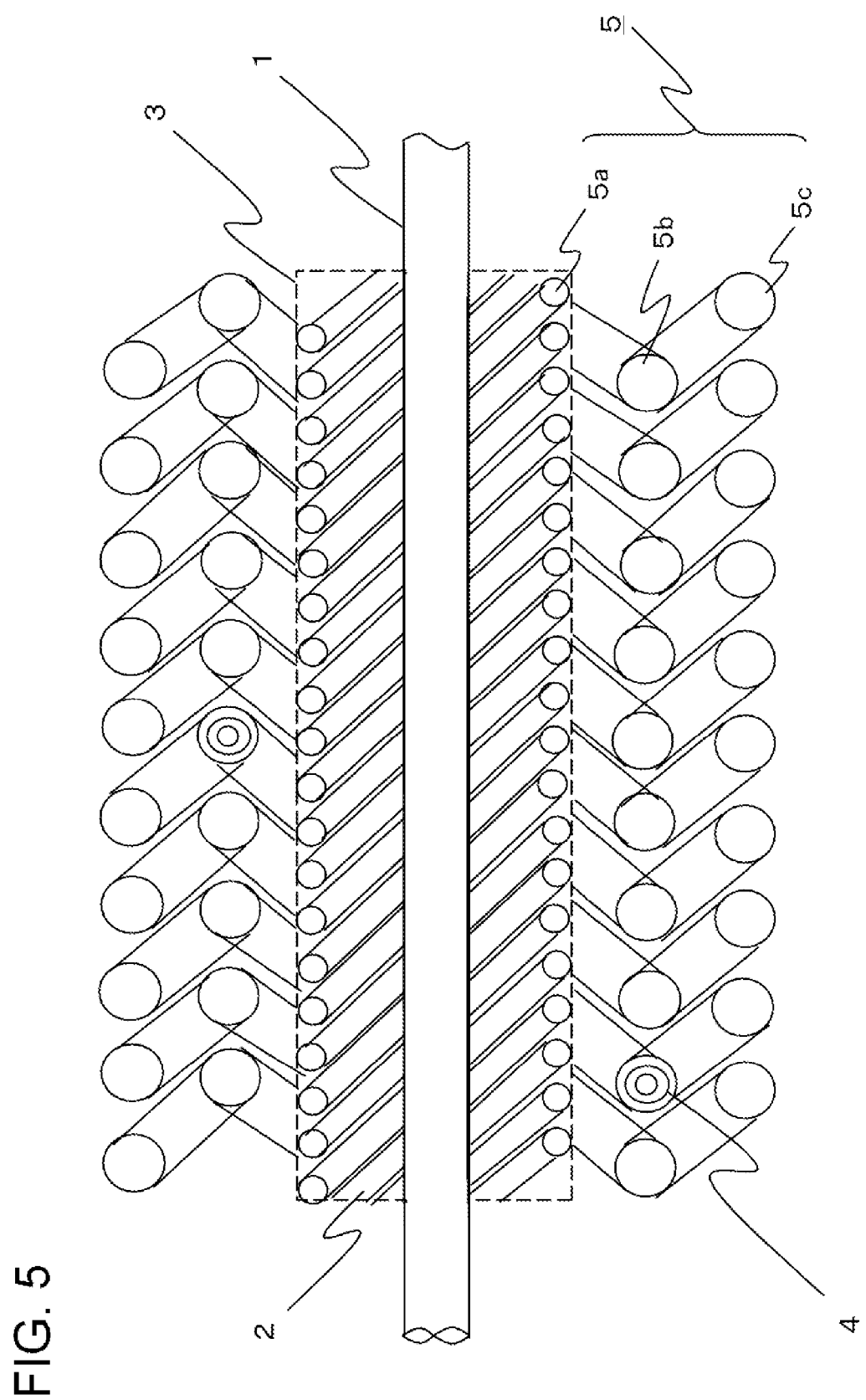
FIG. 5 is a schematic illustration for explaining a longitudinal cross-sectional structure of the optical fiber cable according to Embodiment 1 of the present invention.
Figure 6:
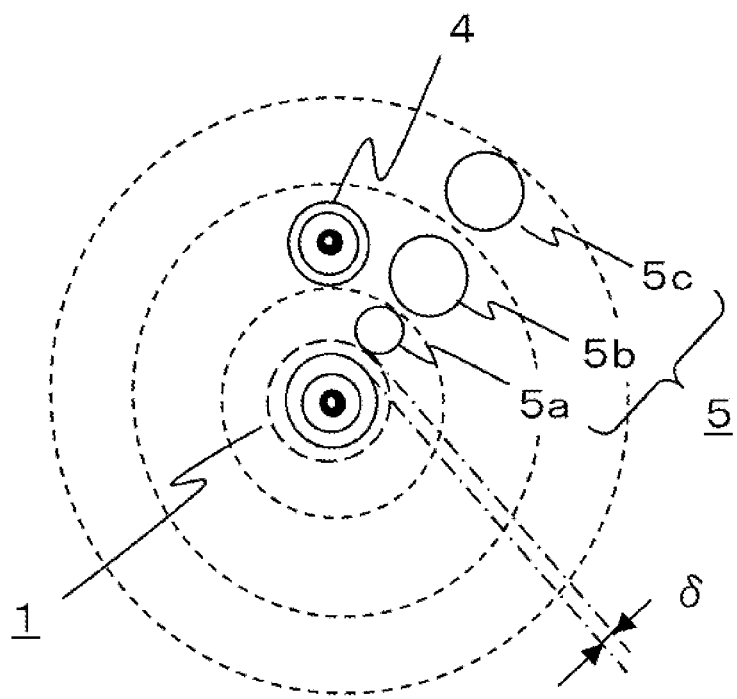
FIG. 6 is a schematic cross section of the optical fiber cable according to Embodiment 1 of the present invention, viewed orthogonally to its axial direction.

A detail structure of the optical fiber cable thus made up is described further with reference to FIGS. 5 and 6. FIG. 5 is a schematic illustration for explaining the longitudinal cross sectional structure of the optical fiber cable and shows a portion corresponding to the length of one fixing member shown in FIG. 3. As shown in FIG. 5, the optical fiber core 1 is fixed to an innermost layer 5a of the multilayer armor cable 5 by the fixing members 3, whereby the clearance space 2 remains formed. In a layer 5b one layer outside the innermost layer 5a, the FIMT 4 (triple circular mark in the figure) having the temperature sensor function is arranged at predetermined positions corresponding to about ten percent of the whole of the layer 5b. FIG. 6 schematically illustrates a cross section of the optical fiber shown in FIG. 5, viewed orthogonally to its axial direction. As shown in the figure, the multilayer armor cable 5 is made up of three concentric layers and the gap $\delta$ is formed between the center optical fiber core 1 and the innermost layer 5a of the multilayer armor cable 5.

Figure 7:
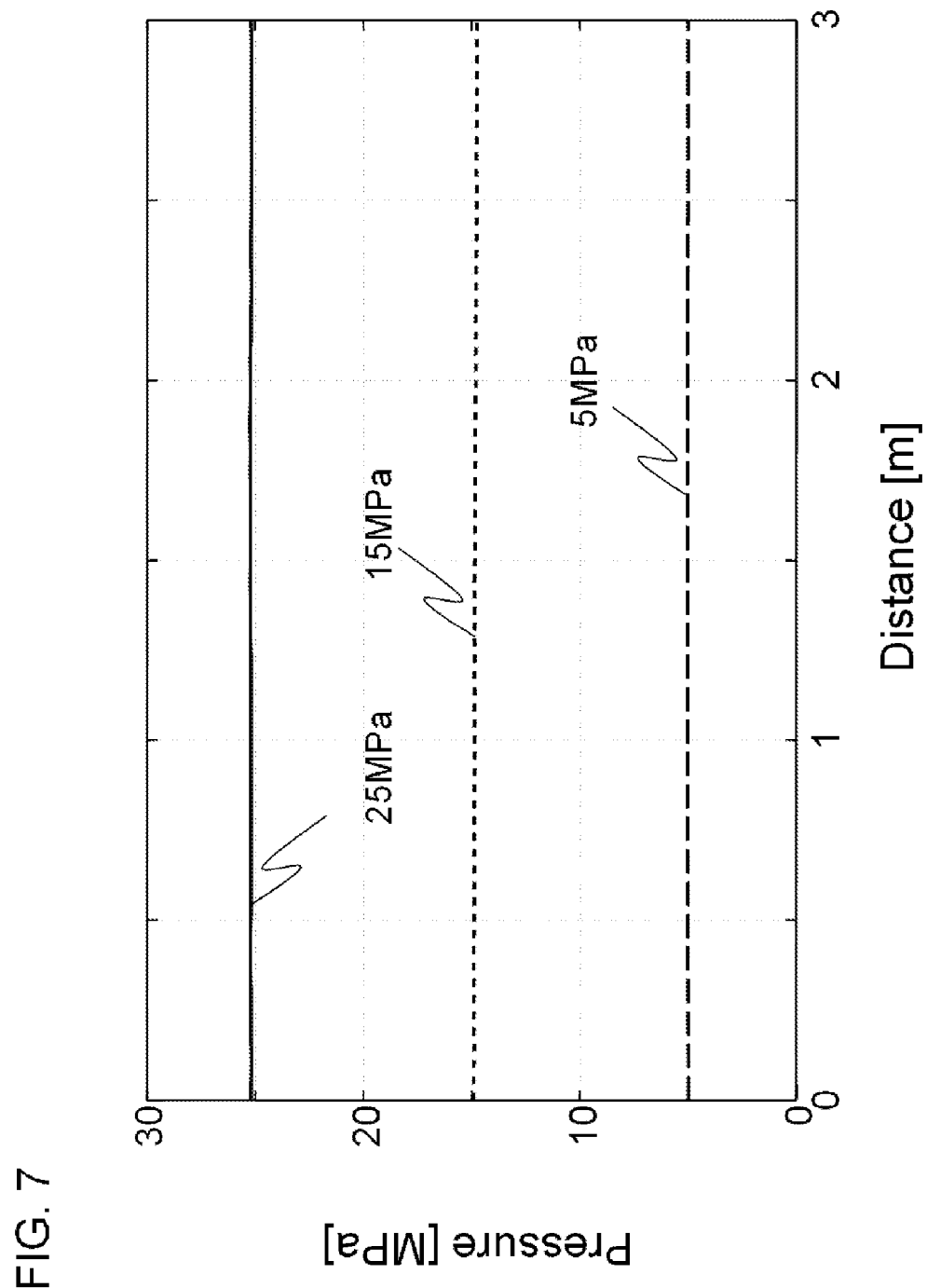
FIG. 7 is an example of measured data of axial pressure distributions measured with the optical fiber cable according to Embodiment 1 of the present invention.
Figure 13:
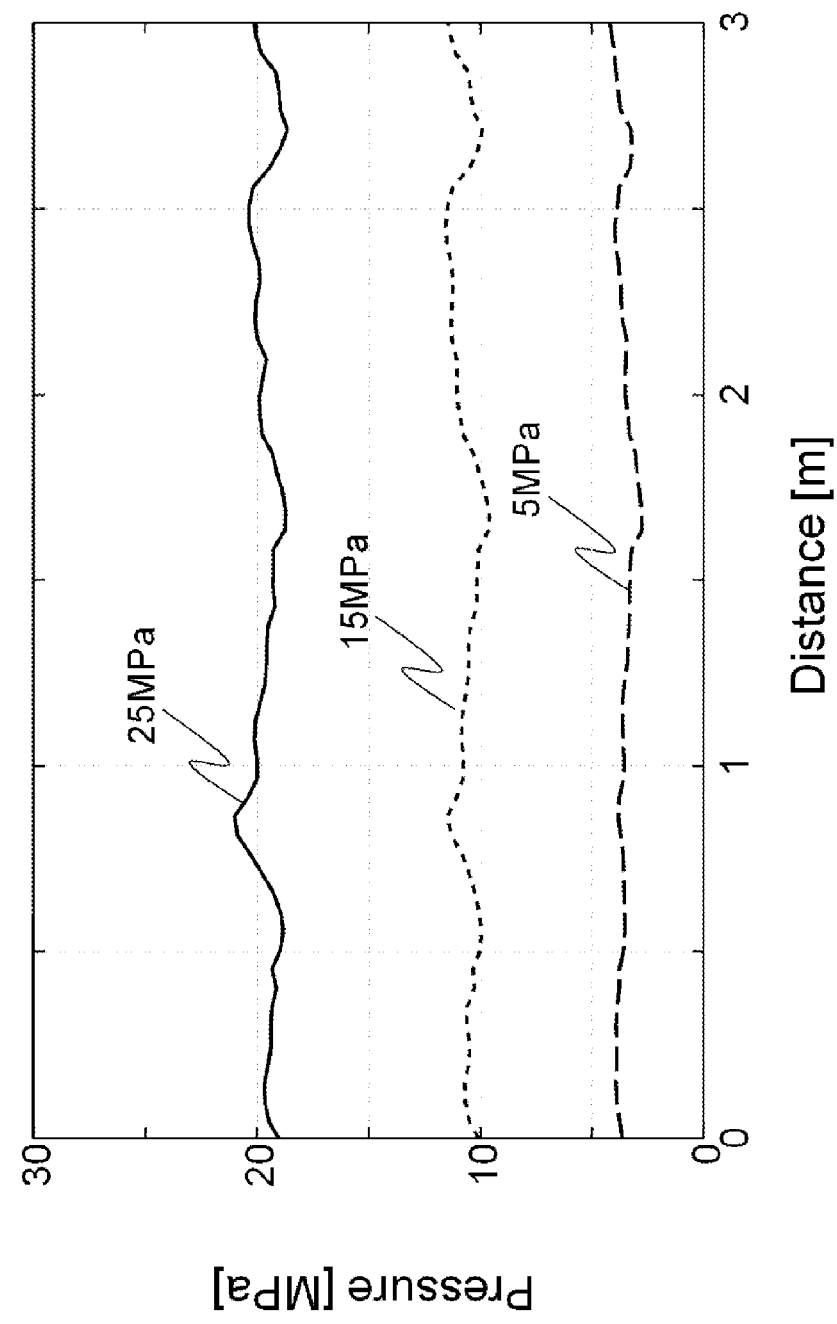
FIG. 13 is a graph showing an example of measurement data of axial pressure distributions measured with the conventional optical fiber cable.

In the case of forming the clearance space 2 as described above, pressure distribution data in the axial direction of the optical fiber cable measured over 3 m long along the cable is different from that shown in FIG. 13. With respect to the three pressure values of 25 MPa, 15 MPa, 5 MPa, which are set as references for evaluation, it is found that the measured pressure values, which are converted using the pressure and strain sensitivities based on the optical fiber element test to pressures from Brillouin and Rayleigh frequency shifts obtained by using the optical fiber cable of the multilayer armor cable form, are no difference from the reference pressure values at any measurement positions in the 3 m long along the cable (see FIG. 7).

Figure 8:
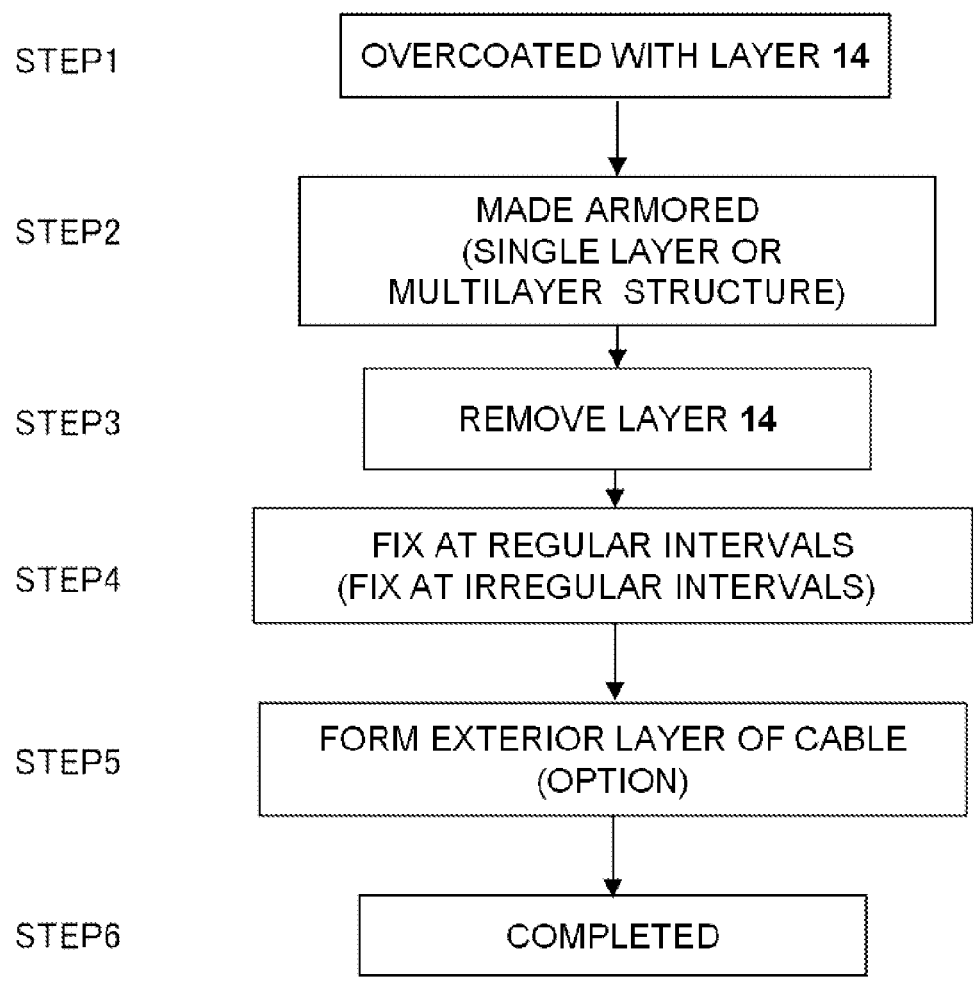
FIG. 8 is a flowchart showing a method of manufacturing the optical fiber cable according to Embodiment 1 of the present invention.
Figure 9:
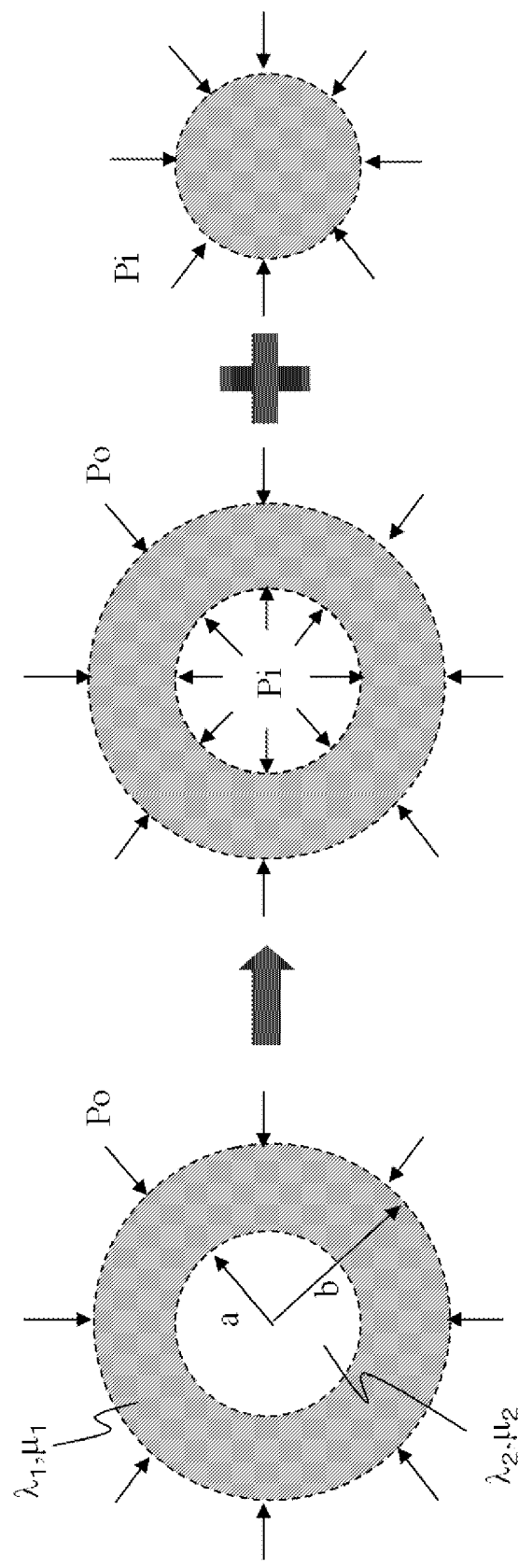
FIG. 9 is a simple model for evaluating pressure applied to the optical fiber cable according to Embodiment 1 of the present invention.
Figure 10:
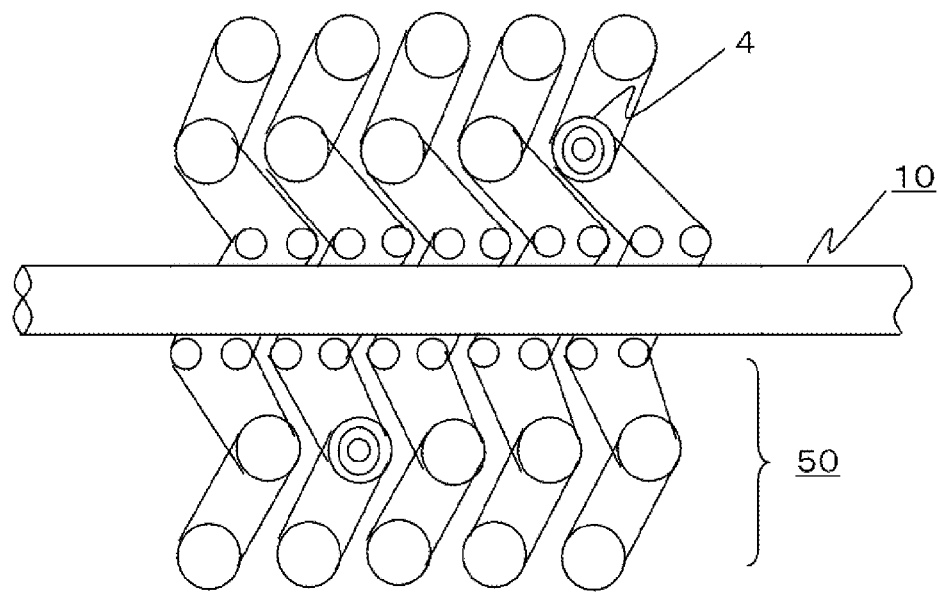
FIG. 10 is an example of a longitudinal cross section showing the main portion of a multilayer armor cable equipped conventional optical fiber cable using two kinds of optical fibers as sensors.
Figure 11:
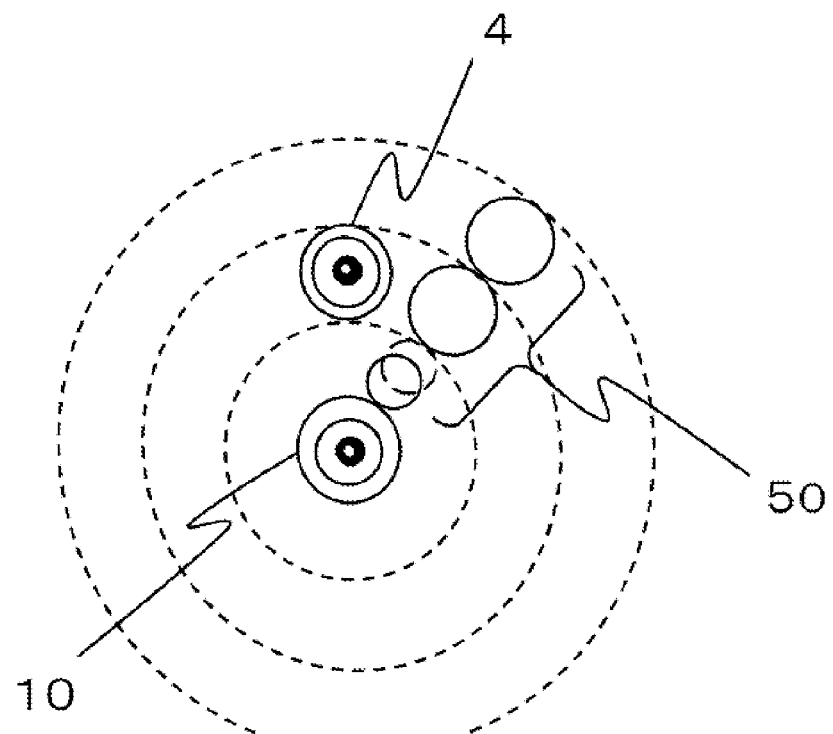
FIG. 11 is a schematic cross section of the optical fiber cable shown in FIG. 10, viewed orthogonally to its axial direction.
Figure 12:
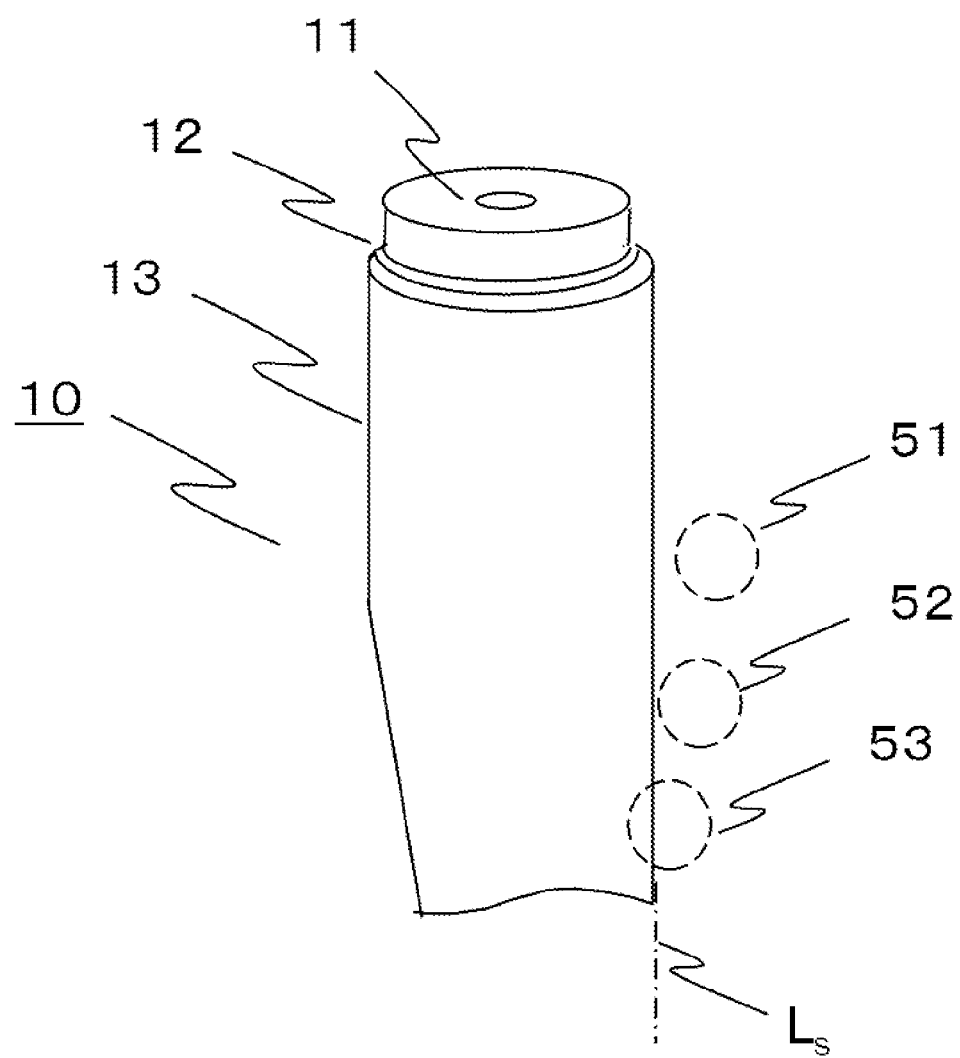
FIG. 12 is an illustration schematically showing positional relationships between the optical fiber core and the steel cable wire in the innermost layer of the multilayer armor cable in a conventional optical fiber cable.

A method of manufacturing the optical fiber cable of the present invention by forming the clearance space and by fixing using the fixing members is described below with reference to the flowchart of FIG. 8. Referring to the figure, in STEP 1, the optical fiber core 1 is overcoated with the water resolvable coat 14 made of a water resolvable resin by the desired thickness $\delta$ for the clearance space. Next, in STEP 2, the steel wire is spirally wound in a single layer or in a plurality of layers around the water resolvable coat 14 to armor the optical fiber cable. Next, in STEP 3, the armored optical fiber cable is immersed in water or hot water to remove the water resolvable coat 14. Next, in STEP 4, an epoxy resin or the like is injected into the clearance space by a constant length (indicated by c in FIG. 3) at regular intervals (indicated by a pitch d in FIG. 3) or by a constant length (indicated by c in FIG. 3) at irregular intervals in the axial direction (longitudinal direction) of the optical fiber cable, to fix the optical fiber core 1 and the armor cable to each other. The radial size for the fixing needs to be at least a level of the innermost layer radius of the armor cable. Finally, in STEP 5 (the step for protecting the optical fiber cable), an exterior layer of the optical fiber cable is further formed optionally. Then, manufacturing of the optical fiber cable is completed.

The optical fiber cable of the present invention thus manufactured can bring about the following effects. First, pressure measurement can be achieved with high accuracy in the pressure sensible sections indicated by "A" (specifically A1, A2, A3) in FIG. 4, as described above. However, coincidence with ambient pressure is not ensured in the pressure insensible sections. If no relative slippage occurs between each armor layer, strain of the optical fiber core is coincident with that of the armor layers with high accuracy (for example, about 1µε).

Furthermore, the present optical fiber cable can complete its service life as long as the cable is not broken. Normally, the optical fiber, if armored, should not be broken before the life of steel because the tensile strength of the optical fiber is greater than that of steel. However, a large strain happens to remain in the optical fiber in manufacturing the armor layers, leading to a primary cause of breakage of the optical fiber. In the present invention, the optical fiber is temporarily put into a free state in STEP 3 of FIG. 8 as previously described. This has an effect of releasing a residual strain. Accordingly, strength of the armor cable can be sufficiently increased without affecting the strength of the optical fiber, thus bringing about an effect of extending life of the optical fiber cable as a whole.

Embodiment 2

While the optical fiber core is usually overcoated with the water resolvable coat 14 under room temperature of about 20° C. in manufacturing the optical fiber cable, in actually using in an oil well or the like, the oil well is in a high temperature condition of more than 100° C. (maximum of 300° C. in some cases) compared to the ordinary temperature, and the temperature of the optical fiber cable itself rises to a high temperature of more than 100° C. according to the temperature of the oil well. As a result, a strain of about 2000µε is produced in the optical fiber core 1, whereby breakage thereof may occur under certain circumferences, posing a problem in ensuring measurement accuracy.

For that reason, in manufacturing the optical fiber cable, the optical fiber core 1 is overcoated with the water resolvable coat 14 not under room temperature but under a high temperature of about 100° C. (100±10° C.) and cooled down to room temperature with it being tensioned. As a result, an overcoated intermediate product of the optical fiber cable is manufactured, with the optical fiber core 1 being strained. Removing the water resolvable coat 14 in the subsequent step, the optical fiber core 1 is situated, with a given strain remaining, at the center of the optical fiber cable, and then fixed at the regular intervals d as shown in FIG. 3. Installing in the above-described high temperature oil well an optical fiber cable 71 that is treated under such a high temperature reduces a strain produced in the optical fiber core 1 by the given amount of strain comparing to the case with the optical fiber cable not treated under a high temperature, bringing about an effect of extending life of such optical fiber cable 71.

Embodiment 3

In another situation, a fluid in the shaft of an oil well may in some cases contain material called proppant, which is treated typically as sand. When the optical fiber cable is installed in a fluid containing the proppant, sand in the fluid causes a problem of erosion of the steel cable wires. In particular, when an optical fiber cable is made by tightly twisting the armor wires, the optical fiber cable may be broken in some cases.

Figure 14A:
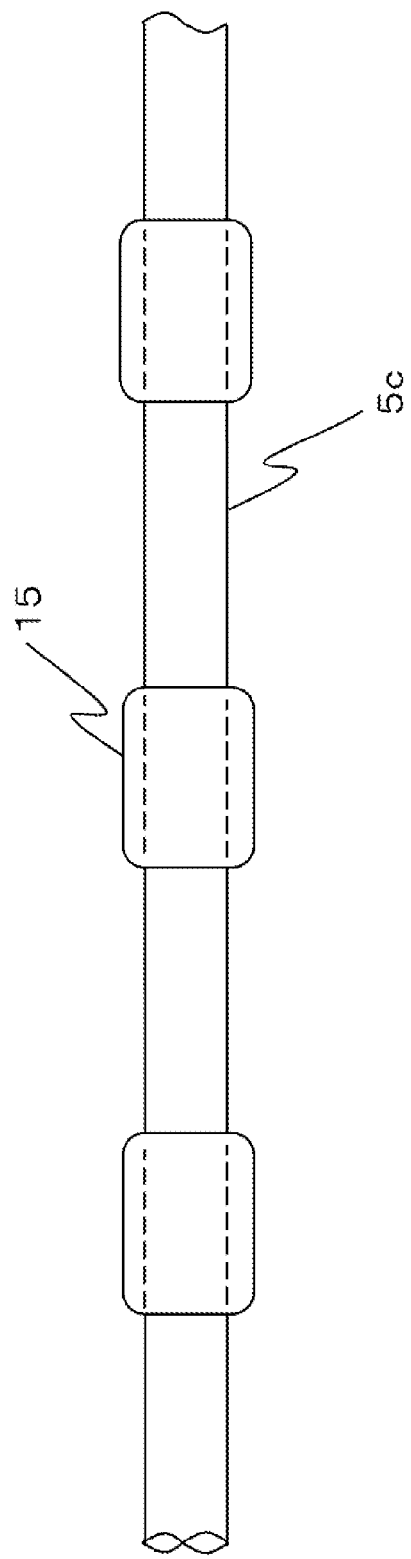
FIGS. 14A and 14B are schematic illustrations each showing the main portion of a multilayer armor cable of an optical fiber cable according to Embodiment 3 of the present invention.
Figure 14B:
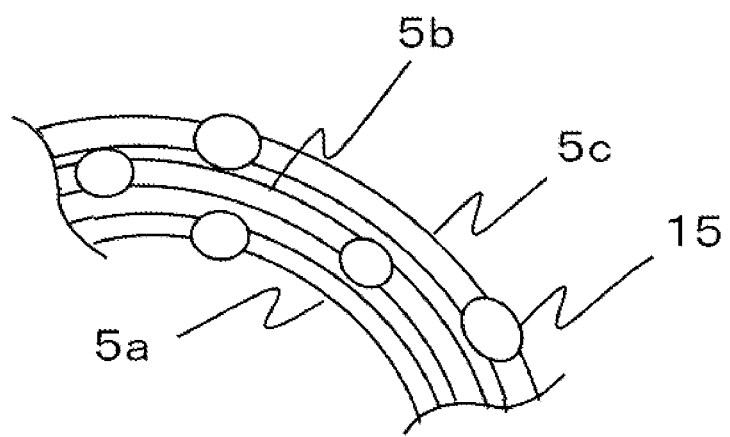

In order to prevent such breakage, in a case of employing strands, each are made by twisting a plurality of wires, for the multilayer armor cable 5 used in the optical fiber cable 7, a method is effective in which expansion members 15, which are made such as of a plastic material softer in hardness than ordinary metal wire, are provided in a bag-like form at intervals on each plurality of wires so as to envelop the twisted wires, as shown in FIGS. 14A and 14B. FIG. 14A is a model illustrating an example of the outermost layer of the multilayer armor cable 5 having the expansion members 15 formed on the outermost layer (the third layer) before stranded, and FIG. 14B is an illustration showing part of the spiral multilayer armor cable 5 after stranded by twisting the wires. The method can protect an optical fiber cable 72 that is provided with the expansion members. To be more specific, since the expansion members 15 reduce moving velocity of the proppant-containing fluid, abrasion loss of the optical fiber cable 72 by the proppant, which causes the problem in measurement using the optical fiber cable, can be reduced. In addition, changing the material of the steel wire also brings about an effect of improving the abrasion loss of the optical fiber cable.

Embodiment 4

The FIMT constituting the multilayer armor cable described in Embodiment 1 is manufactured usually by welding. A pinhole defect that is not detected by a quality check in manufacturing is in some cases found such as through detection of a leak signal (a part of the signal that changes abruptly) in a verification test of a temperature distribution measurement or the like. In addition, a pinhole defect might be created in on-site installation of the optical fiber cable. If such a pinhole defect exists in the FIMT, gases and oleaginous fluid containing water penetrates into the FIMT during use of the optical fiber cable. This not only affects accuracy of temperature, strain, or pressure distribution measurement of a measurement object but also makes impossible the measurement itself, and may further lead to an accident due to leakage to the ground, such as of high temperature and high pressure oil in the underground oil well. This problem is conventionally dealt with, such as by covering the outer circumference of the optical fiber cable with a polymer resin; however, the covering process takes a long time and also causes a factor of high costs in manufacturing the optical fiber cable.

Figure 15:
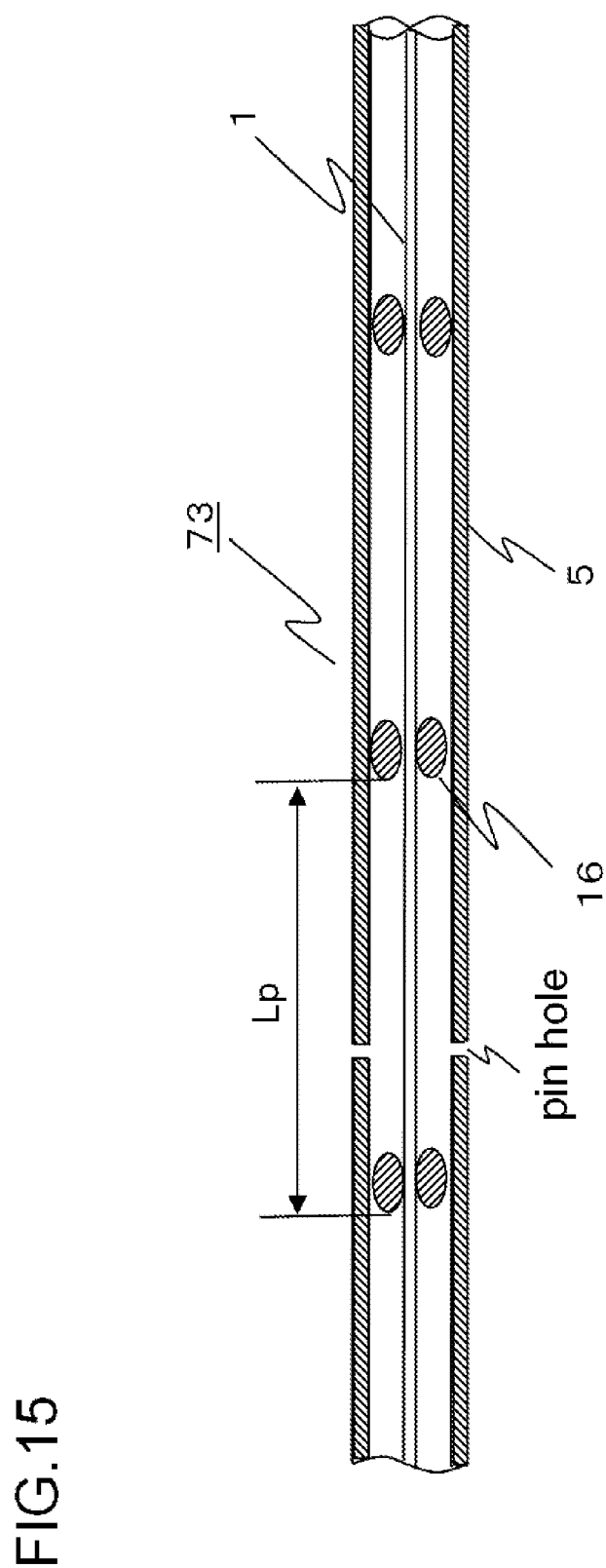
FIG. 15 is an illustration for explaining a configuration of the main portion of an optical fiber cable provided with isolating members according to Embodiment 4 of the present invention.

For that reason, isolating members 16 are provided between the FIMT 4 and the optical fiber core 1 in the radial direction of the optical fiber cable, as shown in FIG. 15.

These isolating members 16 are placed at predetermined intervals Lp (for example, about 10 m) in the longitudinal direction of the optical fiber cable as shown in the figure by beforehand injecting resin in manufacturing the optical fiber cable (before forming the FIMT) or are similarly placed, as members having a blocking function for pressure isolation, in the optical fiber cable at the predetermined intervals Lp by injecting the resin through holes opened in the FIMT after forming the FIMT. In an optical fiber cable 73 that is provided with such isolating members 16, even if a pinhole defect happens to be created in the FIMT, influence of the pinhole is limited to an isolated section (a section between an isolated member and the adjacent isolated member) where the pinhole defect is created, thus bringing about an effect of not influencing the measurement function of the optical fiber cable 73 in whole.

Embodiment 5

The optical fiber cable described above has what is called a passive configuration as a whole and only transmits light. Thus, the cable itself does not have what is called an active function such as of emitting a signal light and changing the transmission path for transmitting a light signal to a target position. In the present embodiment, it is described below that temperature and strain characteristics of a measurement object can be non-passively grasped by providing in the optical fiber cable a heating wire for heating.

Figure 16:
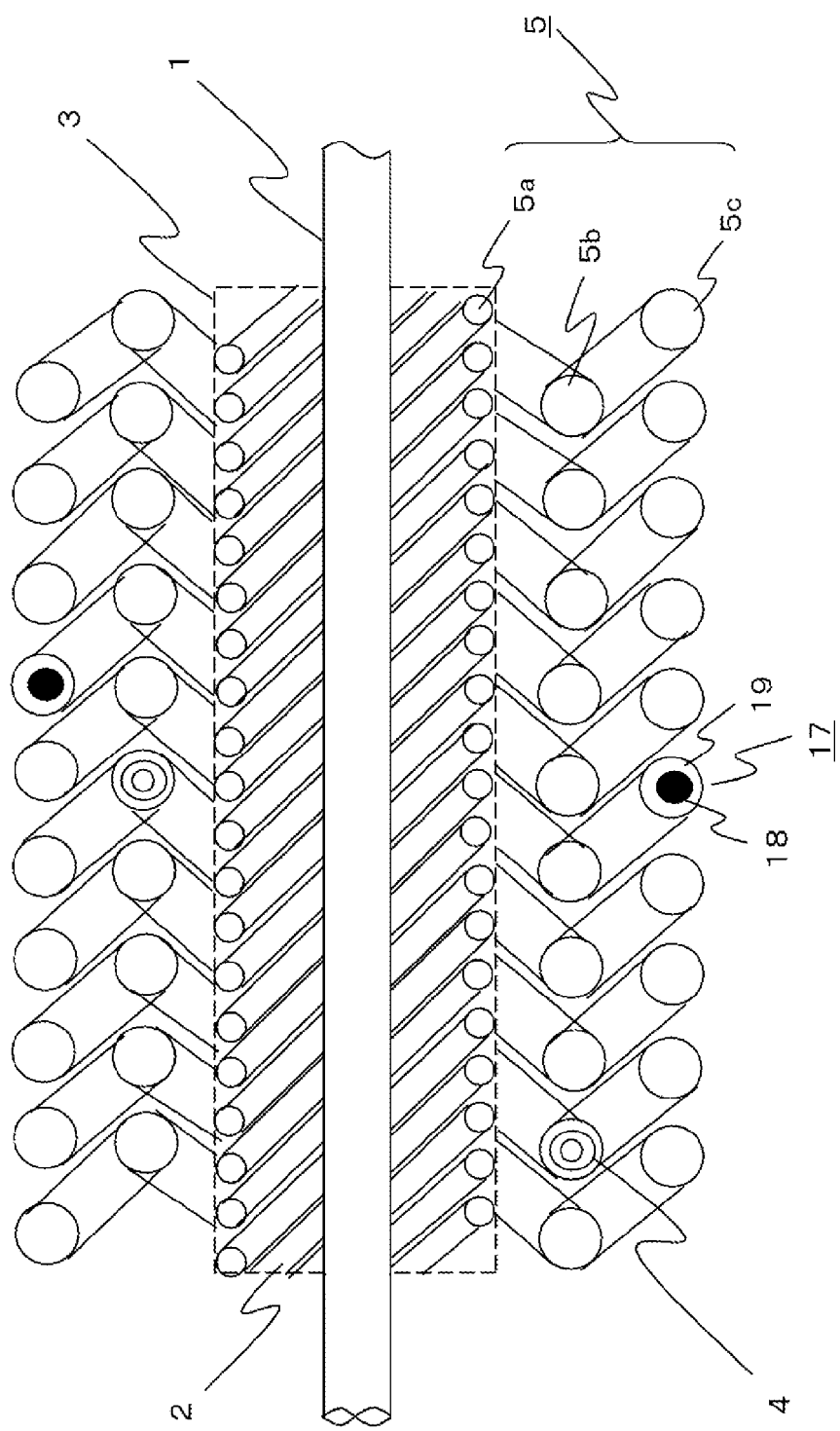
FIG. 16 is a schematic cross sectional structure of the main portion of a heating wire in an optical fiber cable according to Embodiment 5 of the present invention.

FIG. 16 shows a schematic sectional structure of the main portion of a heating-wire-equipped optical fiber cable according to the present embodiment. In the figure, a heating wire 17 is made up of, for example, a center conductive wire (for example, a copper wire) 18 and an outer insulating layer 19 enclosing the wire and provided in a single wire of the outermost layer 5c among the armor cable layers constituting the multilayer armor cable 5 (the heating wire 17 is not limited to be a single wire but may be provided in a plurality of wires). By passing a current through the conductive wire 18, an optical fiber cable 74 that is equipped with the heating wire having such a function of heating the wires can be heated evenly in whole in terms of unit length (for example, about 5° C. up compared to the case without heating). And stopping the flowing current allows for examining the temperature and strain characteristics of the measurement object by observing transitional change of the temperature decrease and the transitional change of deformation of the optical fiber cable.

It should be noted that the present invention is not limited to the description of each embodiment, and each embodiment may be freely combined or appropriately modified or omitted within the spirit and scope of the invention.

REFERENCE NUMERALS

1: optical fiber core
2: clearance space;
3, 3a, 3b, 3c: fixing member;
4: FIMT (fiber in metal tube);
5: multilayer armor cable;
5a, 5b, 5c: armor cable layer;
6: hybrid-type backscattered light measuring instrument (R&B measurement-related unit);
7, 71, 72, 73, 74: optical fiber cable;
8: distributed optical fiber system;
11: optical fiber waveguide;
12: primary coat;
13: secondary coat;
14: water resolvable coat;
15: expansion members;
16: isolating members;
17: heating wire;
18: conductive wire;
19: insulating layer;
P: pressure;
T: temperature;
$\epsilon$: strain

The invention claimed is:

1. An optical fiber cable that is installed in or along a measurement object so as to be deformed along with the measurement object and is for measuring distributions of pressure, temperature, and strain of the measurement object by using a Brillouin frequency shift and a Rayleigh frequency shift of light entered into and scattered in the optical fiber cable, the optical fiber cable comprising:
   an optical fiber core for measuring pressure of the measurement object; and
   a multilayer armor cable for measuring temperature of the measurement object, wherein an annular clearance space is formed between the optical fiber core and the multilayer armor cable, and fixing members are arranged in the clearance space at intervals in the axial direction of the optical fiber cable to fix the optical fiber core and the multilayer armor cable.

2. The optical fiber cable of claim 1, wherein the multilayer armor cable is provided with expansion members enveloping, in a bag-like form at intervals, metal wires forming the the multilayer armor cable or with a heating wire having a conductive wire for passing current and constituting part of the metal wires, or provided with the both.

3. The optical fiber cable of claim 1, wherein isolating members made of resin are provided between an FIMT in the multilayer armor cable and the optical fiber cable in a radial direction of the optical fiber cable to isolate the optical fiber cable into sections of a predetermined length in a longitudinal direction of the optical fiber cable.

4. The optical fiber cable of claim 1, wherein a Rayleigh phase shift is used instead of the Rayleigh frequency shift.

5. A method of manufacturing an optical fiber cable comprising the steps of:
   removing a water resolvable coat after an outermost layer of a pressure measuring optical fiber core of the optical fiber cable is annularly coated with the water resolvable coat having a desired thickness and the optical fiber cable is armored with an armor layer; and
   fixing the optical fiber core and the armor layer to each other by fixing members after removal of the water resolvable coat.

6. The method of manufacturing an optical fiber cable according to claim 5, wherein the coating with the water resolvable coat is performed under high temperature rather than room temperature.

7. A distributed measurement system wherein distributions of pressure, temperature, and strain of a measurement object are measured all at once, using an optical fiber cable set forth in claim 1, with a hybrid-type Brillouin and Rayleigh backscattered light measuring instrument analyzing a Brillouin frequency shift and a Rayleigh frequency shift in scattered light scattered in the optical fiber cable and determining distributions of pressure, temperature, and strain of material.

8. A distributed measurement system wherein distributions of pressure, temperature, and strain of a measurement object are measured all at once, using an optical fiber cable set forth in claim 4, with a Brillouin backscattered light measuring instrument and a Rayleigh phase measuring instrument analyzing a Brillouin frequency shift and a Rayleigh phase shift, respectively, in scattered light scattered in the optical fiber cable and determining distributions of pressure, temperature, and strain of material.

* * * * *